United States Patent [19]

Lee et al.

[11] Patent Number: 5,063,584
[45] Date of Patent: Nov. 5, 1991

[54] METHOD FOR TESTING SUBSCRIBER'S EQUIPMENT

[75] Inventors: Jae S. Lee, Jungku Daejeon; Tae I. Kim; Young S. Kim, both of Daeduckku Daejeon, all of Rep. of Korea

[73] Assignees: Electronics and Telecommunications Research Institute, Seoul; Korea Telecommunications Authority, Yuseong-Ku Daejeon, both of Rep. of Korea

[21] Appl. No.: 549,146

[22] Filed: Jul. 6, 1990

[30] Foreign Application Priority Data

Jul. 8, 1989 [KR] Rep. of Korea ............... 1989-9752

[51] Int. Cl.$^5$ .................. H04M 1/24; H04M 3/24; H04B 3/48
[52] U.S. Cl. .......................................... 379/29; 379/30
[58] Field of Search ............... 379/23, 27, 29, 32, 379/21, 30

[56] References Cited

U.S. PATENT DOCUMENTS 4,764,949 8/1988 Faith et al. ............... 379/27 X

FOREIGN PATENT DOCUMENTS 079666 8/1984 Japan ............................. 379/29

Primary Examiner—Stafford D. Schreyer
Attorney, Agent, or Firm—Blakely, Sokoloff, Taylor & Zafman

[57] ABSTRACT

The present invention interrupts the service after the entire preparation process, and executes testing process after interconnecting the line to the test equipment, and recovers the line as service possible as soon as the test is ended. As a result, the minimum amount of service time is killed by the test. On the test by line maintenance personnel, the present invention reports the personnel about the status of the line by an instant test just after doing hook-on following the ring sent from the exchanger in a specified time. So, the line maintenance personnel can verify the status of the line at instantaneously.

3 Claims, 6 Drawing Sheets

METHOD FOR TESTING SUBSCRIBER'S EQUIPMENT

BACKGROUND OF THE INVENTION

The present invention pertains to a method for testing subscriber's equipment which can detect the malfunctions of the subscriber's equipment. The conventional method for testing subscriber's equipment found the troubles on the subscriber's side just by status measurement of the subscriber's line, and needed additional testing boards or reception boards because it could not support to call the subscriber and to test the subscriber's phone. And only ring test was possible for line maintenance personnel.

In addition, there were some other reasonable methods for the testing of the subscriber's equipment as follows. One was to use a connection method for testing the subscriber's equipment on a semi-electronic exchanger by connecting the test equipments on the electronic exchanger through the semi-electronic exchanger. And another was to install some additional testing methods and equipments for the maintenance of the subscriber's equipment in every exchanger, even though this method needed more cost for the subscriber's parts inside the exchanger. Currently, the test following the subscriber's request and the automatic test were taking the main stream. And these methods could influence the service for the subscriber since they interrupted the service from the beginning of the test to the end of the test. On ring test by line maintenance personnel, after the personnel dials the specified number(118) to the subscriber's phone, if a subscriber does hook-on, then, he sends a ring to the subscriber. After that, if the subscriber does hook-off, he stops sending a ring. Then, the subscriber is recovered to the service state. The problem of the said method was to stop the subscriber's service for the maintenance test as shown in the above.

SUMMARY OF THE INVENTION

It is an object of the invention to provide a method for testing the subscriber's equipment that can minimize the service interruption caused by the test.

To achieve this goal, the present invention interrupts the service after the entire preparation process, and executes testing process after interconnecting the line to the test equipment, and recovers the line as service possible as soon as the test is ended. As a result, the minimum amount of service time is killed by the test. On the test by line maintenance personnel, the present invention reports the personnel about the status of the line by an instant test just after doing hook-on following the ring sent from the exchanger in a specified time. So, the line maintenance personnel can verify the status of the line at instantaneously.

For achieving the performances described above, the entire process of testing method is schematically divided into four steps.

In step 1, commands provided by the operator are analyzed by the Man Machine Processor (MMP), and the result is delivered to the Operation Management and Maintenance Processor (OMP).

In step 2, in case the execution of the test is verified to be possible after checking the status of the processors and the test equipment, the currently pointed Access Switching Processor (ASP) asks the Access Switching Maintenance Processor (ASMP) to interconnect the test equipment.

In step 3, if the line is not on service, the Analog Subscriber Interface Hardware Unit (ASIHU) is asked to connect the subscriber's equipment. Then, a testing execution command is sent to the test equipment.

In step 4, after receiving the result of the test from the test equipment, the line service is recovered, and the result of the test is sent to the Operation Management and Maintenance Processor (OMP), and the Operation Management and Maintenance Processor (OMP) shows the result to the operator.

Particularly, the procedure for reporting the test result to the line maintenance personnel is devided into two steps.

In step 1, the Access Switching Processor (ASP) receives the number dialed by a line maintenance personnel, and prepares the test. Then, in case the test is verified to be possible, a tone is sent. After the personnel who heard the tone does hook-on in 30 seconds, a ring is sent to the subscriber. And if the subscriber does hook-off in 90 seconds after the start of the ring, the test process proceeds.

In step 2, in case the result of the test is good, and a tone is sent again, then the line is recovered after doing hook-on following the tone received.

DESCRIPTION OF THE PREFERRED EMBODIMENT

Figure 1:
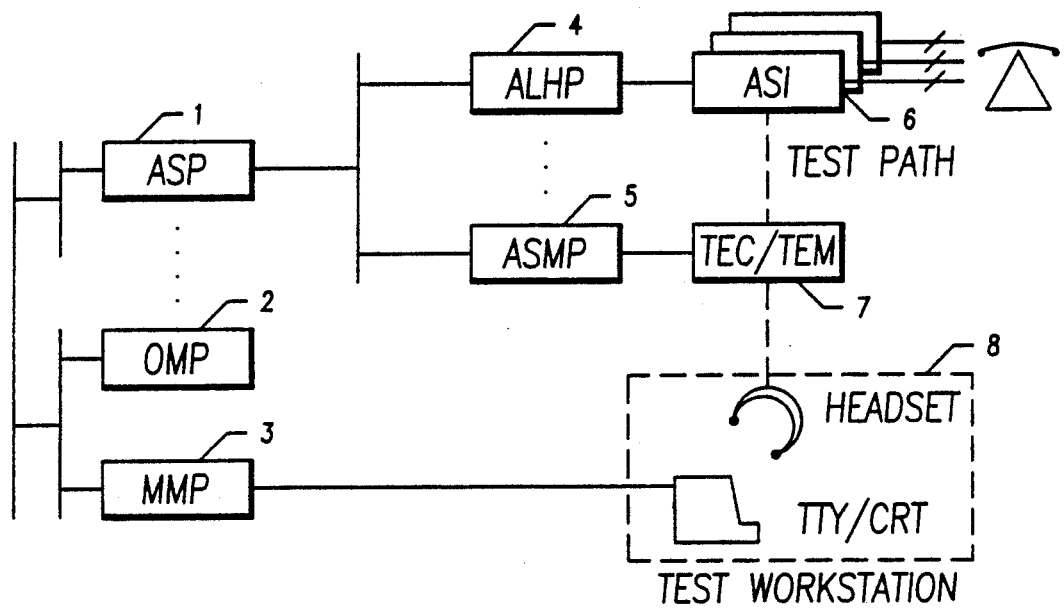
FIG. 1 is a block diagram showing an application of the present invention.

FIG. 1 is a schematic diagram of the hardware which tests the subscriber's equipment. In FIG. 1, Block 3 shows a Man Machine Processor (MMP) to control the input and the output of a testing board (8) which performs interface functions with an operation. Block 2 shows an Operation Management and Maintenance Processor (OMP) to maintain the exchanger. Block 1 shows an Access Switching Processor (ASP) to control the subscriber and the line. Block 7 shows a test equipment to test the subscriber's equipment. Block 5 shows an Access Switching Management Processor (ASMP) to provide a connection between the test equipment and ASP 1. Block 4 shows an Analog Subscriber Interface Processor (ASIP) to process the analog line. Block 6 shows an Analog Subscriber Interface Hardware Unit (ASIHU) to make an interface with the subscriber.

Figure 2:
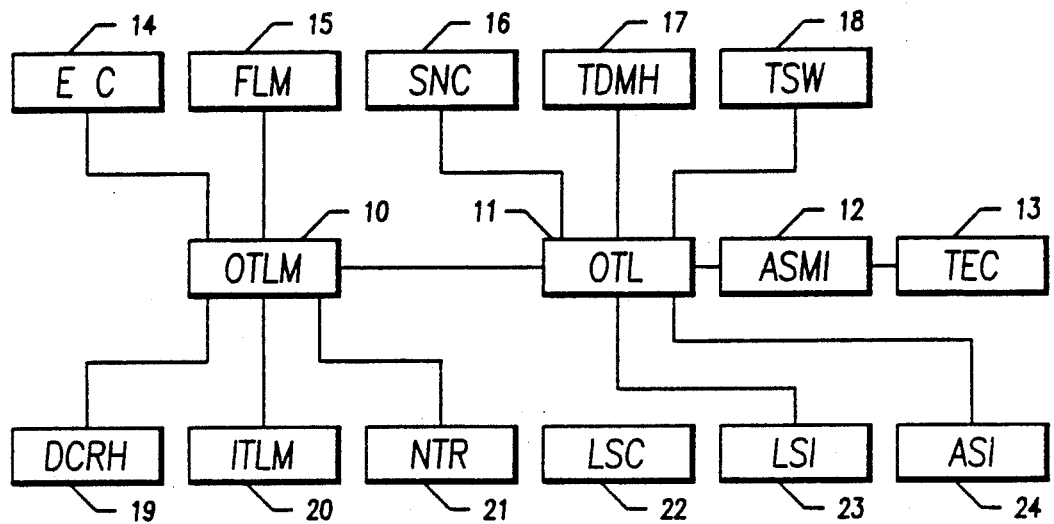
FIG. 2 is a block diagram of the software for the present invention.

FIG. 2 is a schematic diagram showing the software architecture to test the subscriber's equipment. The whole software is composed of an Out Test Line Management (OTLM)(10) to manage the test of the subscriber's equipment, an Out Test Line (OTL)(11) to control the test of the subscriber's equipment, a Test Equipment Control (TEC)(13) to control the test equipment, an Access Switching Maintenance Interface (ASMI)(12) to provide a connection between OTL and TEC, a Fault Management (FLM)(15) to manage faults, an In Test Line Management (ITLM)(20) to manage the test of the subscriber's access circuitry, an Execution Control (EC)(14) to control the execution of the test, a Number Translation (NTR)(21) to convert the subscriber's line number to the equipment number, a Telephony Device Maintenance Handling (TDMH)(17) to manage the status of the equipments of the telephony devices, an Analog Subscriber Interface (ASI)(24) to make an interface with the analog subscriber, a Local Service Control (LSC)(22) to provide signal service, a Local Service Interface (LSI)(23) to make an interface for signal service, a Diagnosis Control and Result Handling (DCRH)(19) to process the result and the diagnosis control, Time Switch (TSW)(18), and a Switch Network Control (SNC)(16) to control the switch network.

There are several test functions for analog subscriber's equipment as follows: Status test of line, hearing of the subscriber's call, telephonic communication with the subscriber, key-set test of the subscriber's phone, providing contact points for manual test, telephonic communication with main distributing frame personnel, test of coaxial cable, light tone transmission, and conversion of the test-related data.

The status test of line determines whether the status of the line is good or not by measuring three ports, port Tip-Ring, port Tip-Ground, and port Ring-Ground, about their AC voltages, DC voltages, resistance values, static capacitance values etc. after arbitrarily choosing one of the two strips of the subscriber's line as Tip, and the other as Ring.

In addition, there are Instant Test, Step Test, Repeating Test etc. for the measurement of the status of line. Instant Test reports the result determined by comparison between the reference values and the all values mentioned above for the whole area to the operator or to the block chose to be tested inside the system. Step Test reports only one item measured about just one section of the whole area to the operator, and also reports the item chose as soon as a little change occurs by keeping on measuring it. And in case when the operator requests a break, the system stops testing. After the fault report from the subscriber, hearing of the subscriber's call makes direct connection with the telephonic communication equipment mounted on the test equipment for determining whether the line is actually in use, or the line seems to be in use for the reason that a fault has occurred while being in use. For the remote subscriber, the remote test equipment and the test equipment at the central office can be connected through S-switch for monitoring of the status of the subscriber by the operator at the central office.

Telephonic communication with the subscriber function proceeds after the subscriber does hook-off by the subscriber following the ring sent for the purpose of checking whether the subscriber's phone is malfunctioning or not. For the remote subscriber, the remote test equipment and the test equipment at the central office should be interconnected through S-switch.

Key-set test of the subscriber's phone function tests the key-set of the subscriber's phone by letting the subscriber to push key-set of the phone after the start of normal telephonic communication. At this time, the operator inputs the type of the subscriber's phone (DP or MFC) and a command. When the type of the subscriber's phone is DP (dial pulse) type, the test equipment measures the digits pushed by the subscriber, the pulse rate (pulses per second), and the pulse break rate (pulses per second) together, and reports them to the operator. When it is MFC type, the equipment measures and displays the digits, the low harmonics and the high harmonics together till the operator asks to stop.

Providing contact points for manual test function builds an environment to make the external probe of a practical measurement equipment to be directly connected to the captured subscriber's line for measuring the status of the subscriber's line when it is hard to determine the status of the subscriber's line just with the result measured by the internal measurement equipment of the system.

Telephonic communication with main distributing frame personnel function performs the test of coaxial cable by proceeding telephonic communication after interconnecting the line for distributing frame personnel at the main distributing frame. For the telephonic communication with the remote main distributing frame, the remote testing equipment should be connected with the testing equipment at the central office through S-switch.

Test of coaxial cable function can be performed by letting the main distributing frame personnel to connect the coaxial cable being tested to the plug branched from the testing equipment. After that, the result is generated following the same procedure as the Step Test.

Light tone transmission function transmits a light tone to the particular line connected with the testing equipment for helping an electrician to find out it easily.

The various test functions described above can be classified into several types as follows along the execution style. Test along the demand of the operator, the test along the demand of the system itself, the periodic automatic test, and the test by the line maintenance personnel. The test along the demand of the operator includes Instant Test, Step Test, Repeating Step, Telephonic communication with the subscriber, Key-set test of the subscriber's phone, Telephonic communication with the main distributing frame personnel, Test of coaxial cable, light tone transmission, General test of subscribers, Alteration of the test data, and Control of the test for reporting the results to the operator. Instant Test can be performed just by one command for numerous subscribers having a single track or having successive numbers. And the test along the demand of the subscriber can be done on the test board at the switching center or the operating center.

Figure 3:
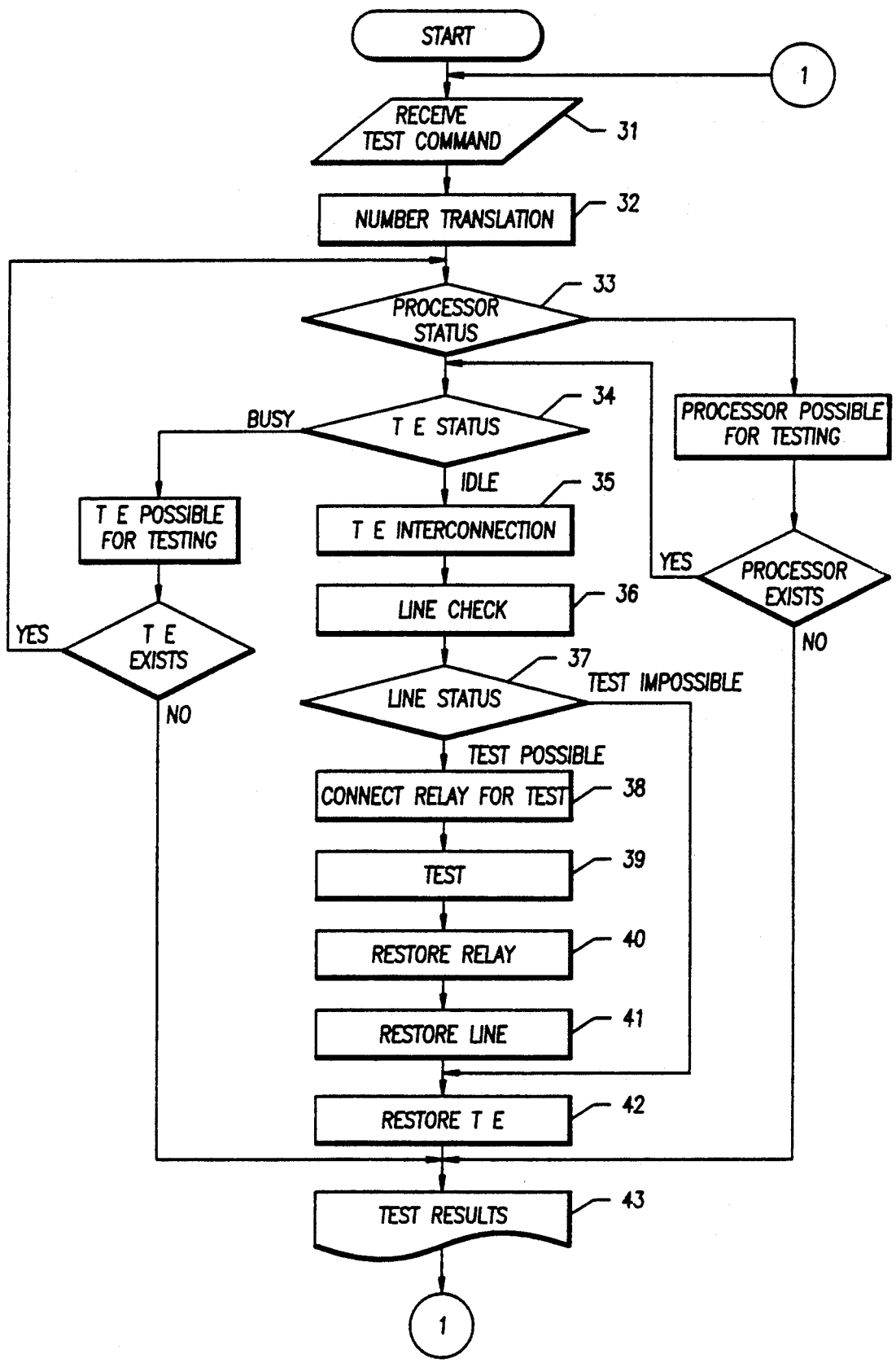
FIG. 3 is a flowchart showing an embodiment of the operator's requirement of the present invention.

FIG. 3 is a flowchart showing the practical application of the test along the demand of the subscriber. The command supplied by the operator is analyzed with the MMP(3), and is transmitted to the EC(14) of OMP(2). Then, EC(14) transmits it to OTLM(10). OTLM(10) executes number translation(32). After the status verification of the pertinent processor(33) and the test equipment(34), if the execution of the test is possible, the command is sent to OTL(11) of ASP(1). Then, OTL(11) asks ASMP(5) to interconnection of the test equipment(35). After the status verification of the subscriber, in case the line is not in service, it demands interconnection(36) of the subscriber's equipment to ASIHU(6). And then, the execution of the test(39) is done by connecting the relay(38) for test after the verification of the status of line. If the test results are received from the test equipment, the restoration of relay for test(40) and the restoration of the line status are done first. Also, the test results are sent to OTLM(10), then OTLM(10) transmits them to EC(14) for showing them to the operator(43).

Test along the demand of the system itself includes the fault verification test along the demand of FLM and the status verification test along the demand of TDMH for the subscribers who haven't used for a long time and who are blocked by long-time malfunction. Test along the demand of the system reports the results to the block which asked the test after Instant Test for the verification of the line status.

Periodic automatic test periodically performs Instant Test along the timer installed inside the system. And then, the line status is reported to TDMH for controlling the status of the subscriber's equipment.

There are some flowcharts showing embodiments for the tests by line maintenance personnel from FIG. 4 through FIG. 8.

Figure 4:
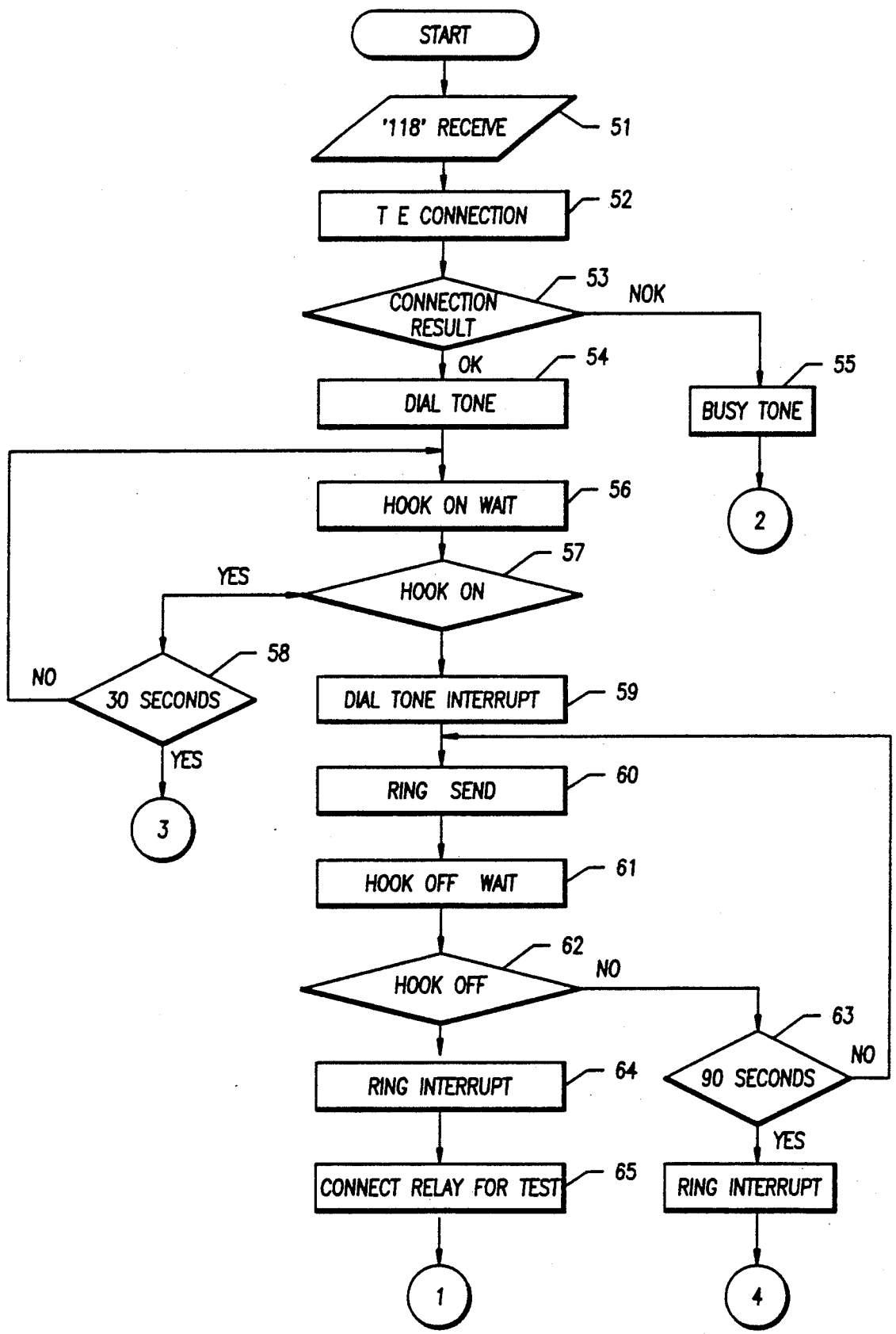
FIG. 4 to FIG. 8 are showing embodiment of some tests done by line maintenance personnel.
Figure 5:
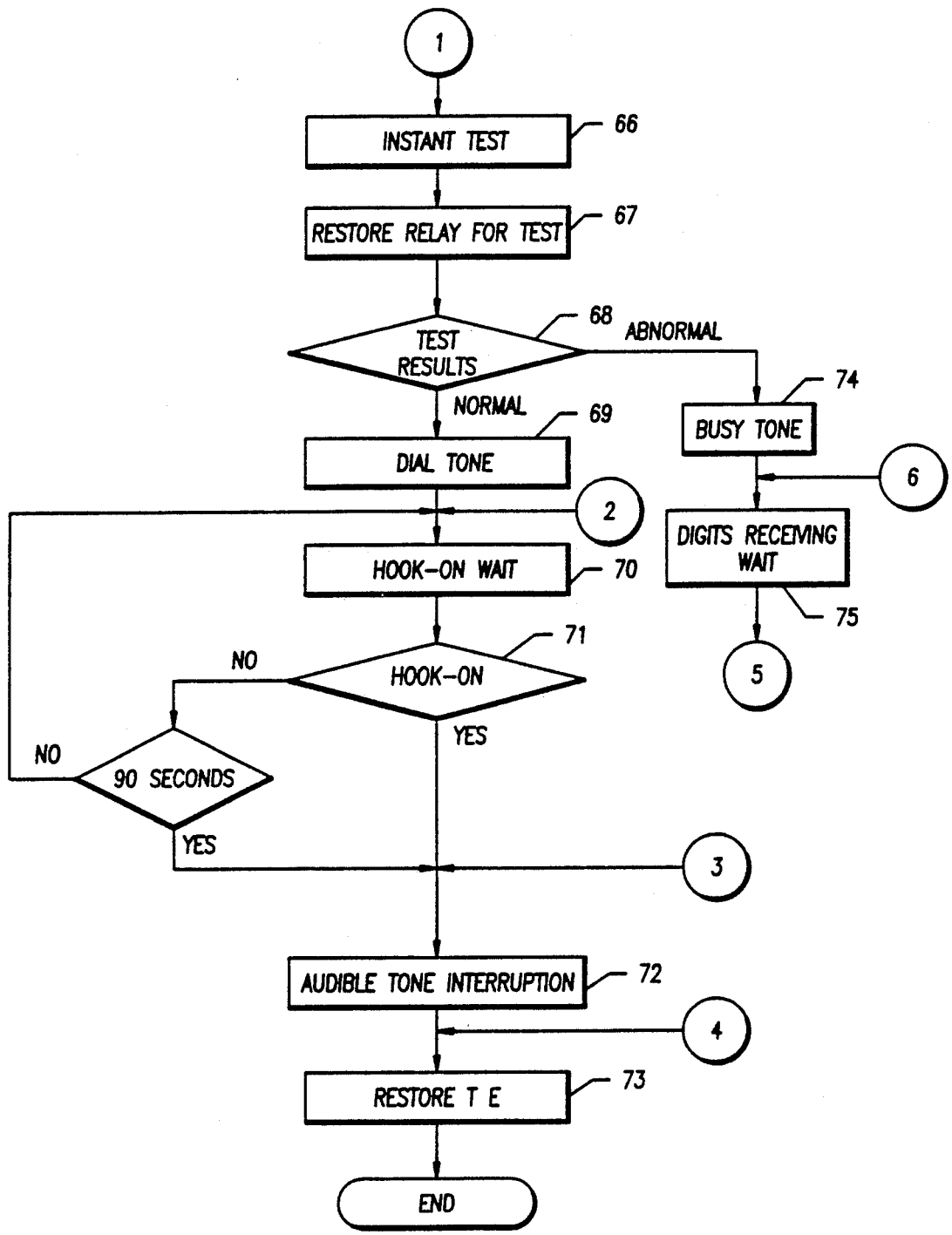
Figure 6:
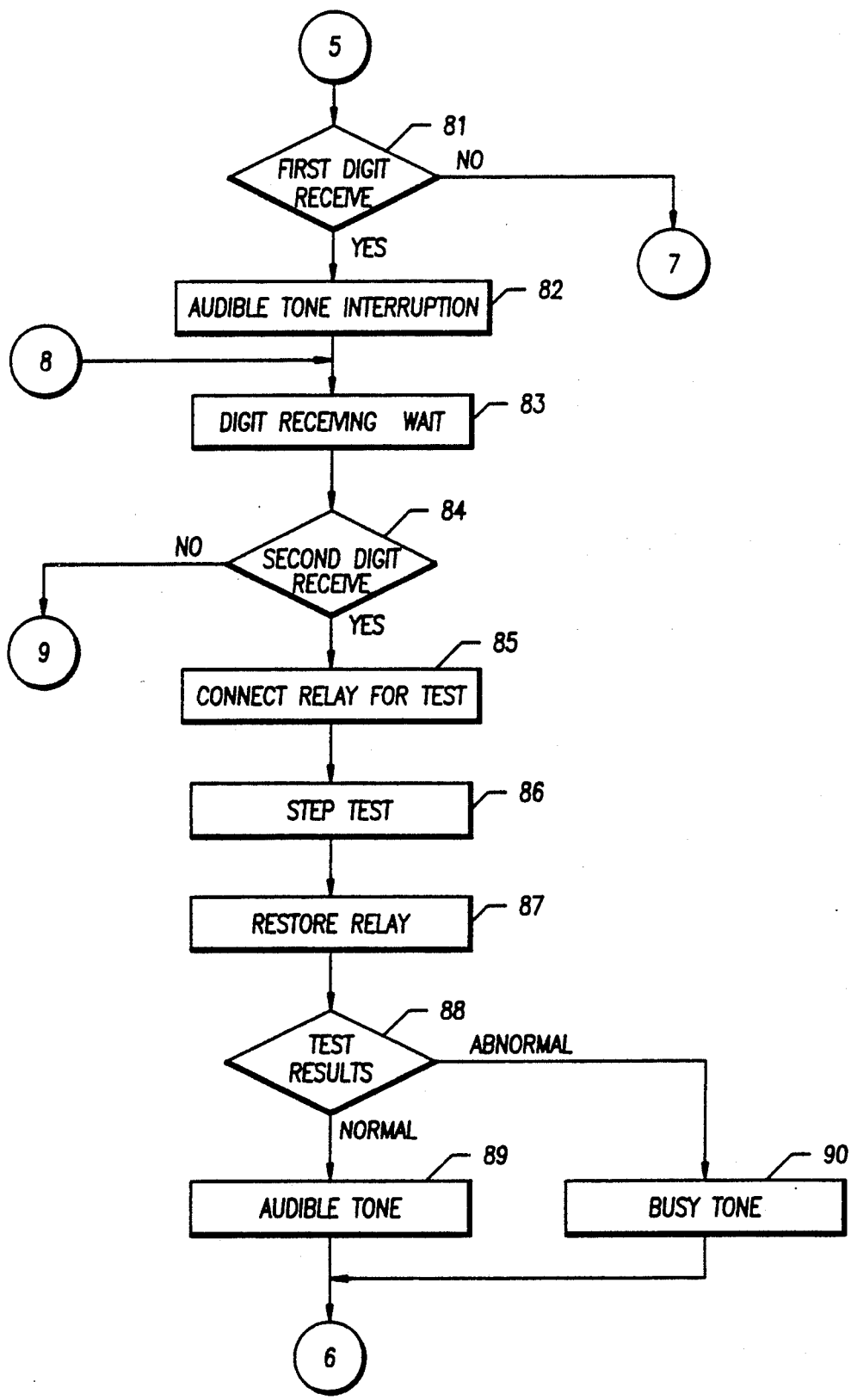
Figure 7:
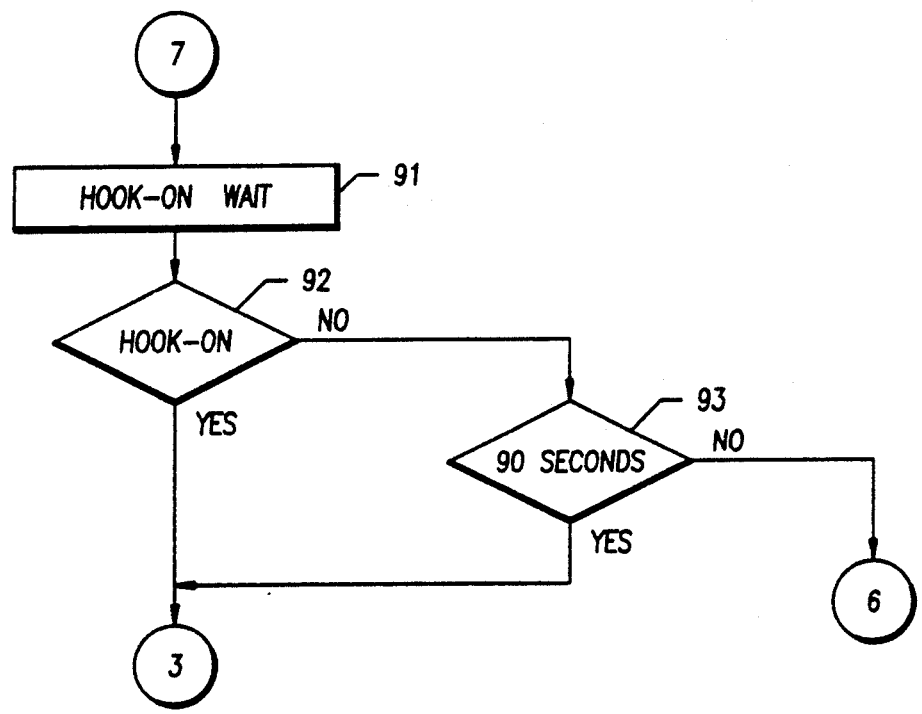
Figure 8:
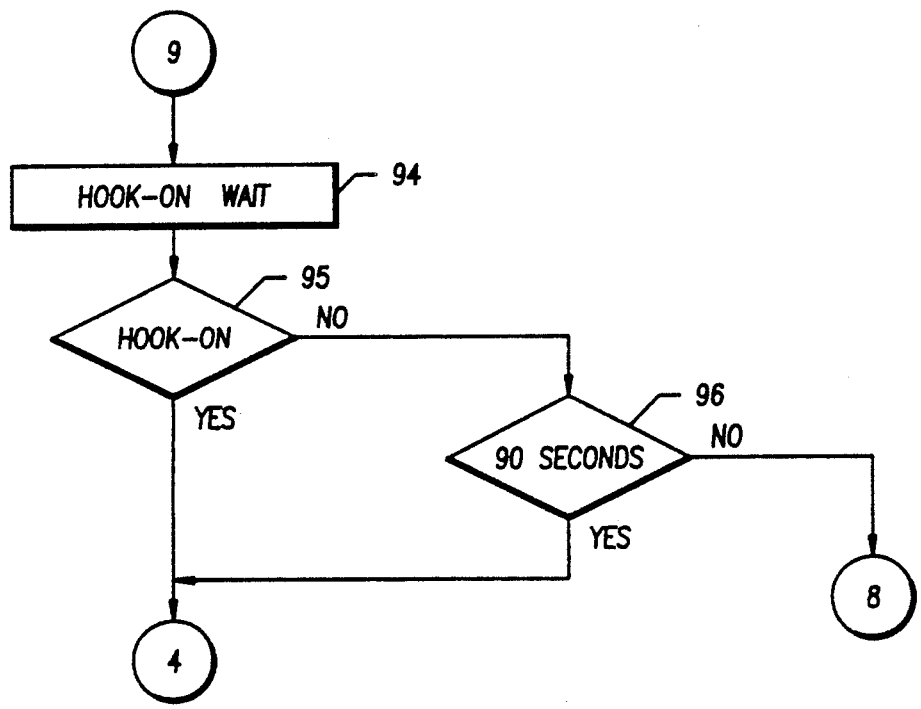

In FIG. 4, after the line maintenance personnel dials the specified number(118) from the subscriber's phone, OTL(11), which receives the signal, informs ASI(24) that this call is for the test of the subscriber's line. And when the test is possible, a dial tone is transmitted(54), and when the test is impossible, a busy tone is transmitted(55). If he does hook-on in 30 seconds from the moment he receives a dial tone (56,57,58), a ring is sent to the subscriber(60) after interrupting the transmission of the dial tone(59). After that, when he does hook-off of the phone (61,62,63) in 90 seconds from the moment the ring is received, the ring transmission is interrupted(64), and the Instant Test is getting started (65,66,67). In case it is proved to be good, the test is ended after the subscriber does hook-on the phone following a dial tone transmitted. Subsequently, the line status is restored by ASI(24) which is informed that the test is ended (from 68 to 73).

In case the result of the Instant Test is said to be abnormal, a busy tone is sent(74), and the line status is got into the waiting status. At this time, if the line maintenance personnel pushes two digits, the execution of the appropriate Step Test is done (from 81 to 88). When the result of the test is said to be normal, a dial tone is sent(89), and when it is said to be abnormal, a busy tone is sent(90). The line status of the subscriber is restored after doing hook-on.

Following statements describes the testing procedure which should be followed by the line maintenance personnel while executing the Step Test.

At first, the transmission of the dial tone is interrupted(82) by reception of the first digit(81). Also, that can be interrupted by doing hook-on in 90 seconds (91,92,93) without the reception.

And when the second digit is received, the Step Test is executed(86) after the interconnection of the relay for test(85). If not, the test is ended by doing hook-on in 90 seconds(94,95,96).

The present invention can greatly reduce the cost for additional installation by the application of the internal test equipment inside the exchanger without any other additional equipment. Since the test of the subscriber's equipment is performed by the line maintenance personnel who has recovered the malfunctioning equipment, the status verification test about the equipment can be easily done.

What is claimed is:

1. In an electronic exchanger comprising a testing board, a Man Machine Processor to control the input and the output of the testing board which performs interface functions with an operator, an Operation Management and Maintenance Processor, an Access Switching Processor to control a subscriber's equipment and a line, a test equipment for performing test of the subscriber's equipment, an Access Switching Management Processor for providing between the test equipment and the Access Switching Processor, an Analog Subscriber Interface Processor for processing an analog line, and an Analog Subscriber Interface Hardware Unit for making an interface with the subscriber, a method for testing the subscriber's equipment comprising steps for:

analyzing commands provided by the operator, and delivering the results to the Operation Management and Maintenance Processor;

delivering the commands to the Access Switching Processor and asking the Access Switching Maintenance Processor to interconnect the test equipment in case the execution of the test is verified to be possible after checking the status of the processors and the test equipment;

asking the Analog Subscriber Interface Hardware Unit to connect the subscriber's equipment in case the line is not on service after checking the subscriber's line, and delivering a testing execution command to the test equipment; and recovering the subscriber's line to the service status after receiving the result of the test from the test equipment, sending the result of the test to the Operation Management and Maintenance Processor, and showing the result to the operator.

2. In an electronic exchanger comprising a testing board, a Man Machine Processor to control the input and the output of the testing board which performs interface functions with an operator, an Operation Management and Maintenance Processor, an Access Switching Processor to control a subscriber's equipment and a line, a test equipment for performing test of the subscriber's equipment, an Access Switching Management Processor for providing between the test equipment and the Access Switching processor, an Analog Subscriber Interface Processor for Processing an analog line, and an analog subscriber interface hardware unit for making an interface with the subscriber, a method for testing the subscriber's equipment comprising:

a first step receiving the number dialed by a line maintenance personnel in the Access Switching Processor and preparing the test, sending a tone to the personnel in case the test is verified to be possible, sending a ring to the subscriber in case the personnel who heard the tone does hook-on in 30 seconds, and proceeding the test in case the subscriber does hook-off in 90 seconds after the start of the ring; and a second step sending a tone to the subscriber in case the result of the test is normal, and recovering the line after doing hook-on following the receiving tone and ending the test.

3. A method according to claim 2, wherein a second step further comprises a step sending a busy tone to the subscriber in case the result of the test is abnormal, doing a step test according to the contents of the two digits pushed by the line maintenance personnel, and recovering the line after doing hook-on following the result of the test and ending the test.

* * * * *

UNITED STATES PATENT AND TRADEMARK OFFICE
CERTIFICATE OF CORRECTION

PATENT NO. : 5,063,584
DATED : November 5, 1991
INVENTOR(S) : Lee et al.

It is certified that error appears in the above-identified patent and that said Letters Patent is hereby corrected as shown below:

On title page, item [73] Assignees, change:

"Electronics and Telecommunications Research Institute, Seoul; Korea Telecommunications Authority, Yuseong-Ku Daejeon, both of Rep. of Korea"

to

--Electronics and Telecommunications Research Institute, Yuseong-Ku Daejeon; Korea Telecommunications Authority, Seoul, both of Rep. of Korea--

Signed and Sealed this

Eighteenth Day of July, 1995

*Attest:*

BRUCE LEHMAN

*Attesting Officer*     *Commissioner of Patents and Trademarks*